Figure 1:
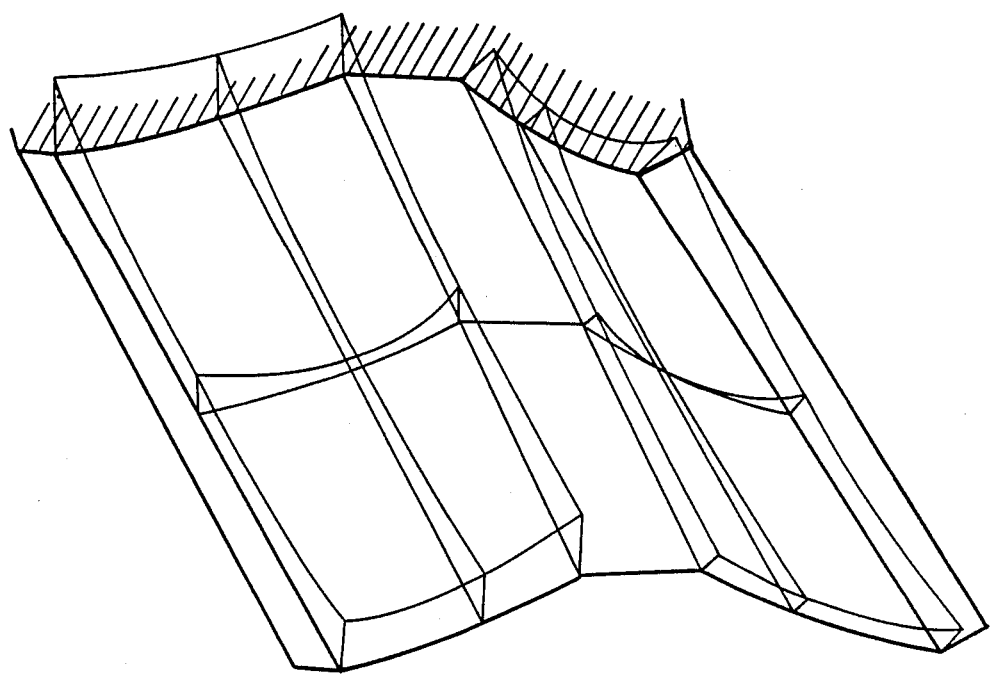

United States Patent [19]

Sulzer

[11] Patent Number: 4,850,155
[45] Date of Patent: Jul. 25, 1989

[54] METHOD FOR MACHINING GEARWHEELS

[75] Inventor: Gerd Sulzer, Wiggensbach, Fed. Rep. of Germany

[73] Assignee: Liebherr-Verzahntechnik GmbH, Kempton, Fed. Rep. of Germany

[21] Appl. No.: 154,703

[22] Filed: Feb. 11, 1988

[30] Foreign Application Priority Data

Feb. 13, 1987 [DE] Fed. Rep. of Germany ....... 3704607

[51] Int. Cl.⁴ .............................................. B24B 1/00
[52] U.S. Cl. .................................. 51/287; 51/52 HB; 51/105 HB
[58] Field of Search ............. 51/287, 52 HB, 105 HB, 51/206 P, 95 GH

[56] References Cited

U.S. PATENT DOCUMENTS 1,833,227 11/1931 Olson .............................. 51/105 HB
4,561,216 12/1985 Miyatake et al. ................ 51/52 HB

FOREIGN PATENT DOCUMENTS 0015947 12/1941 United Kingdom .................. 51/287

OTHER PUBLICATIONS

"Pfauter-Waelzfraesen", Part 1–Manufacturing Methods 4.1.8.2.3 and Crowning Hobbing with Special Hobs 4.1.8.2.3.1, p. 437.

Primary Examiner—Frederick R. Schmidt
Assistant Examiner—Robert A. Rose
Attorney, Agent, or Firm—Foley & Lardner, Schwartz, Jeffery, Schwaab, Mack, Blumenthal & Evans

[57] ABSTRACT

A method is described for hob grinding helical gearwheels by continuous diagonal hobbing using a tool in the form of a substantially involute worm whose active length is greater than the length of the working area and whose center distance from the gearwheel is changed during its feed motion in the diagonal direction from the axial and tangential directions to generate lateral crowning. The pressure angle of the right or left flanks decreases continuously from a maximum value starting at one end of the worm toward the other end, whereby the maximum pressure angle of the right flanks at one end of the worm coincides with the minimum pressure angle of the left flanks, and vice versa.

1 Claim, 9 Drawing Sheets

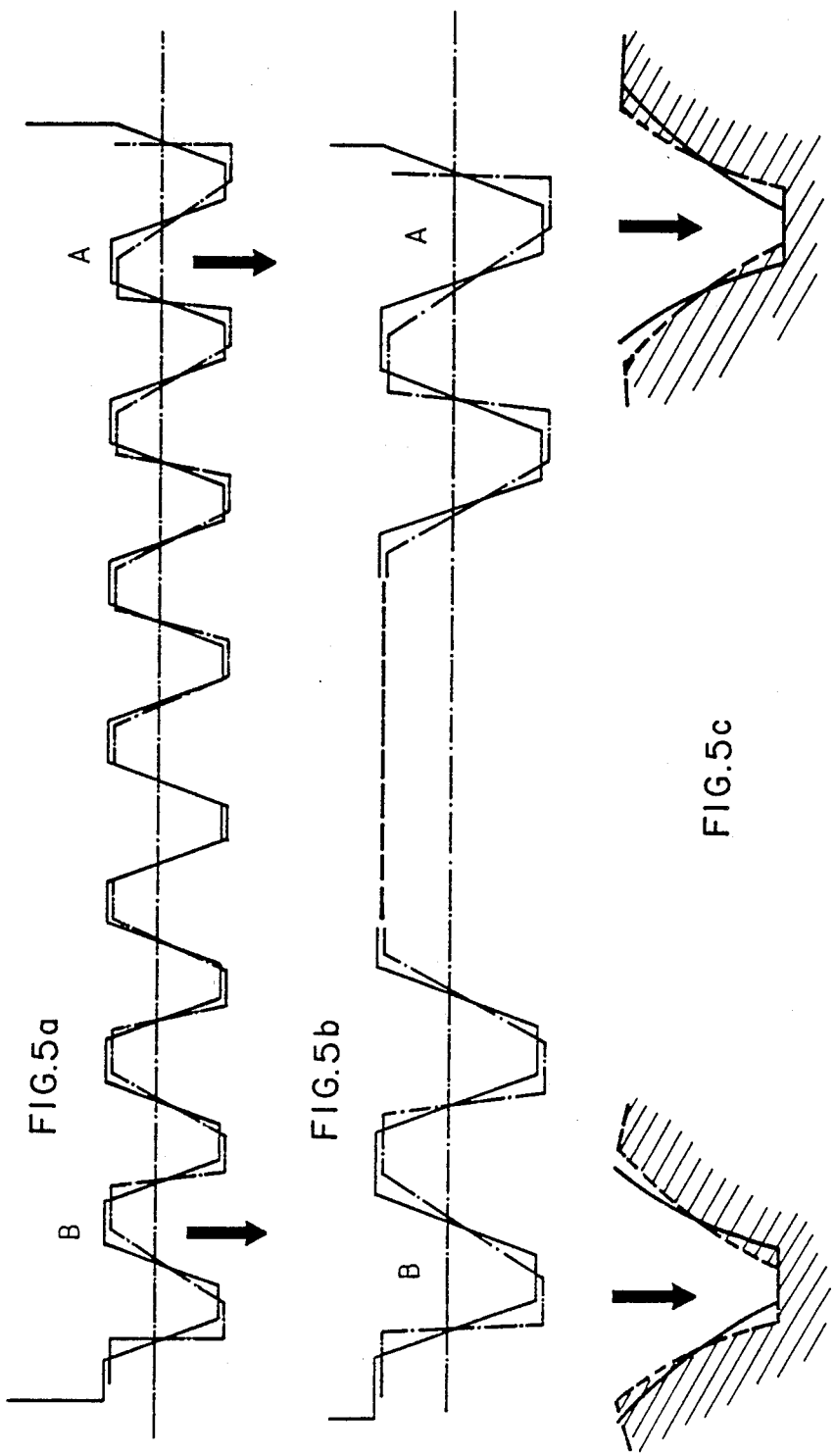

METHOD FOR MACHINING GEARWHEELS

The present invention relates to a method for grinding helical gearwheels by continuous generating with diagonal feed motion using a tool in the form of a substantially involute worm whose usable length is greater than the length of the working area and whose center distance from the gearwheel is changed during its feed motion to create crowned tooth flanks. The said feed motion is diagonal, i.e., simultaneously in the axial and tangential direction with reference to the gear.

Gear-cutting machines that use the diagonal method are known both for cutting gearwheel production, such as hobbing, and for fine machining of pretoothed gearwheels, such as skine hobbing generation. The flank shape is crested during generating as the envelope of individual tool cutting edges. The tool position relative to the work wheel changes continuously due to the hobbing of the work wheel on the tool. The tooth flanks are not formed exactly, but approximated in the manner of facets by a finite number of facet. Each envelope cut of the small profile touches the theoretical involute profile at one point; all other points deviate from the involute profile to a greater or lesser degree. As a result this leads to a scaly surface structure which is removed by subsequent fine machining methods, such as generation grinding.

However, the theoretically exact involute profile is modified to optimize the load behavior and minimize noise. For example, it is customary to generate a certain profile crowning (tip relief) to obtain maximum smoothness of operation. Furthermore, the tooth contact at the beginning of mesh generated by the tip relief is important for the formation of an oil film between the working flanks. This top crowning or tip relief is obtained by appropriately profiling the flanks of the tool. Correction of the flank geometry across the face of the tooth, i.e. a certain lateral crowning or tapered form of the tooth space and inclination of the crowning, is effected by additional motions imparted either to the work wheel or to the tool, which change the center distance between the tool and the wheel during the axial run through the tooth space. When flanks are being corrected in spur-gear wheels, this method does produce the desired result, since the small angle of intersection of the tool axis with the workpiece face means that the generating axial profile is located approximately on the transverse plane of the workpiece. i.e. a certain center distance acts upon the two flanks of a tooth space on one and the same transverse plane.

If the axial intersection angle between the work wheel and the tool is other than 90°, for example only about 60°, however, the changed mesh relations lead to unequal correction of the corresponding left and right flanks of a tooth space. This is due to the fact that the line of action or the intersection curve between the tool and the work wheel is not located on a plane perpendicular to the work wheel axis (xy plane), but is inclined in relation to this plane. Corrections generated by a radial feed motion of the tool with respect to the workpiece axis are therefore ineffective on a plane perpendicular to the work wheel axis, taking effect instead at different heights with respect to the tooth space. The result is a distortion of the flank profile, in particular in the run-in area and run-out area of a tooth space. These distortions mean increased noise, greater attrition due to uneven operation and poor load behavior.

To optimize the noise, lifetime and load capacity of gear wheels, it is necessary to be able to correct the flank geometry individually in terms of its direction and profile form. The inclination and extent of crowning may be different at the base of the tooth, the middle of the tooth and the tip of the tooth, whereby the values for the drive flank may in turn be different to those for the coast flank.

Longitudinal tooth corrections and lateral crowning are usually carried out by combined radial-axial movement, i.e. change of center distance during the axial motion of the tool. Due to the fact that the plane of action between the tool and the workpiece is at an angle to the workpiece face, distortions arise whose extent is directly dependent on the selected correction of the center distance, the wheel width and the size of the working area between the tool and the workpiece. The distortions are greater the greater the helix angle, the smaller the pressure angle and the greater the cutting depth. In addition, they are dependent on the addendum factor of the tool, in the case of helix angles of approximately 30°, the occurring distortions may in fact be greater than the desired corrections themselves.

Flank corrections are usually measured only in the middle between the base and tip, and profile corrections only at half the wheel width, so that the distortions occurring at the tooth space run-in and run-out areas are frequently not detected at all.

The invention is based on the problem of allowing for longitudinal tooth corrections by center distance modifications while at the same time avoiding their disadvantageous distortions.

This problem is solved according to the invention by the features stated in the characterizing part of the main claim. The finding crucial to the invention is that a certain axial area of the tool worm is associated with each area of a tooth space (regarded in the axial direction of the gearwheel). Since the flank geometry of the worm spirals changes in the axial direction, the tooth space to be generated is produced by a more or less constantly changing tool across the tooth space width. During the generating motion between the work wheel and tool the worm is displaced not only axially to the work wheel but also tangentially thereto, so that the run-in area of a tooth space is machined by a different part of the worm compared to the run-out area of this tooth space, regarded across the height or width of the work wheel.

In order to obtain the desired corrections on the involute teeth of the workpiece, on the one hand, and avoid the described distortions, on the other hand, the tool teeth have different pressure angles on the left and right flanks. Furthermore, the pressure angle and tooth thickness change from one end of the tool towards the other in such a way that, in conjunction with a center distance correction (as a function of the momentary position of the tool relative to the gearwheel height), the distortional effect thereof is compensated.

The tangential displacement of the tool with respect to the work wheel beyond the length of the working area is known as such in connection with diagonal hobbing. However, the known tangential displacement is only intended to allow for improved utilization of the tool and longer service life. The known gear hobs have a flank geometry which is constant over their axial length.

It is already known from "Pfauter-Wälzfräsen, Teil 1, Verfahren, Maschinen, Werkzeuge, Anwendungstechnik, Wechselräder" (Pfauter hobbing, Part One, Methods, machines, tools, application technology, change wheels), Springer-Verlag, p. 436, to generate crowned gear teeth using a hob with a tooth thickness and a tooth form varying in the direction of its axis and employing the diagonal method. In this method the hob is adjusted in such a way that its greatest tooth space comes to work in the middle of the workpiece width, so that the greatest tooth thickness arises there. Thicker hob teeth work at the two ends, i.e. the workpiece teeth are thinner there (double-duplex type).

However, the known method is suitably only for generating lateral crowning in spur-toothed wheels. If the method were used for helical gears this would again result in the above-mentioned distortions due to the inclination of the plane of action relative to the transverse plane of the gearwheel.

The invention opens up a different path in so far as the lateral crowning is initially effected in the conventional way by a center distance correction. The tool moves away from the gearwheel during the axial feed and is advanced again after exceeding a maximum. This radial feed can be controlled mechanically, electrically or else electronically. In the case of helical gears, this method necessarily leads to considerable distortions of the flank profile at the tooth space run-in and run-out areas, which are mutually mirror-inverted. These distortions are eliminated according to the invention by the fact that the pressure angles of the tool worm flanks vary over the length of the worm. A certain area of the tool and a certain generating center distance are associated with a certain area of the tooth space in each case. This makes it possible for the first time to approximate the ideally corrected flank profile of helical gearings.

Figure 2:
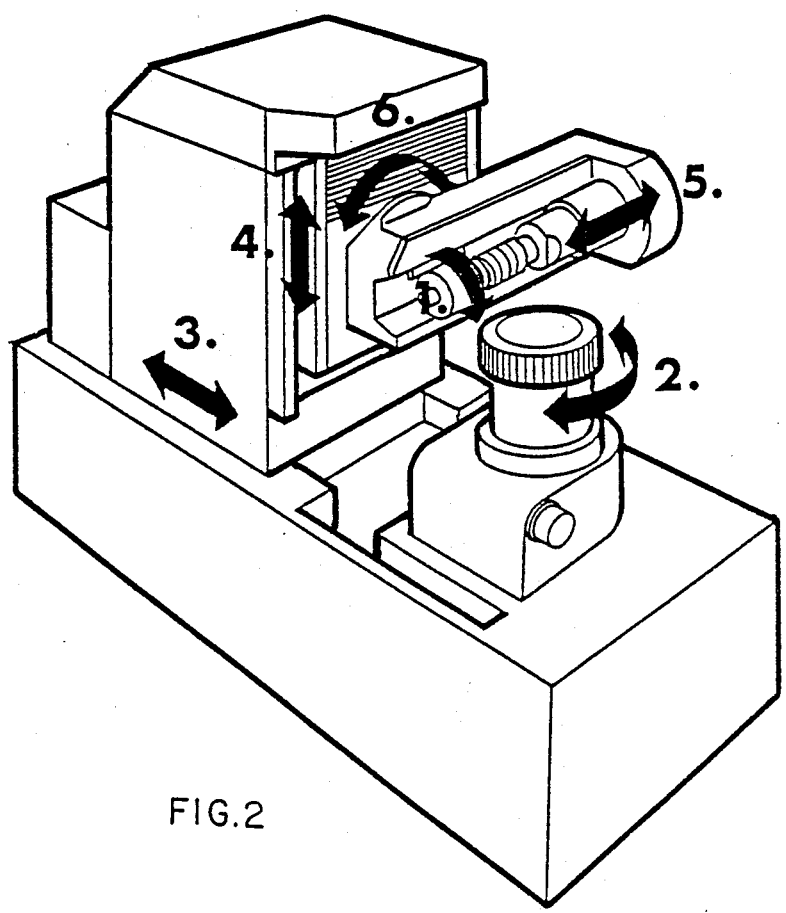
Figure 3A:
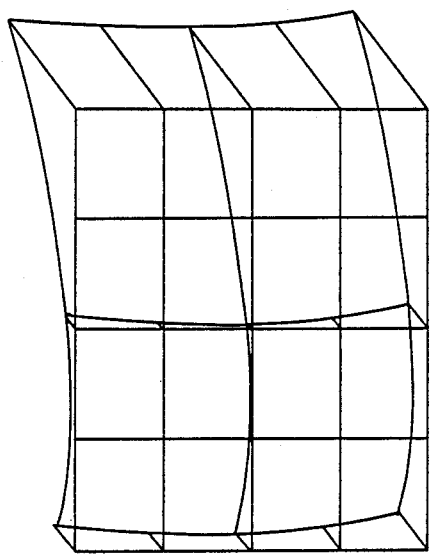
Figure 3B:
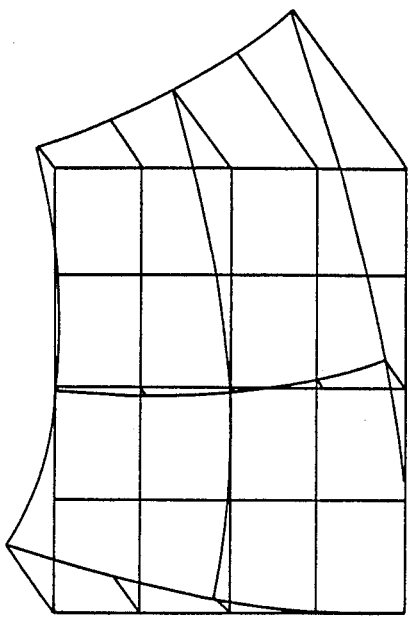
Figure 3C:
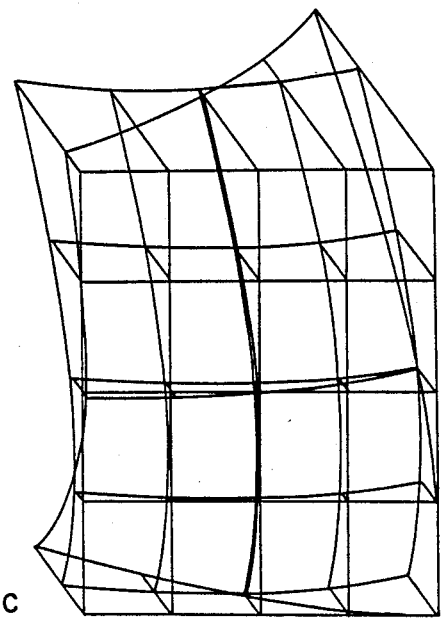
Figure 3D:
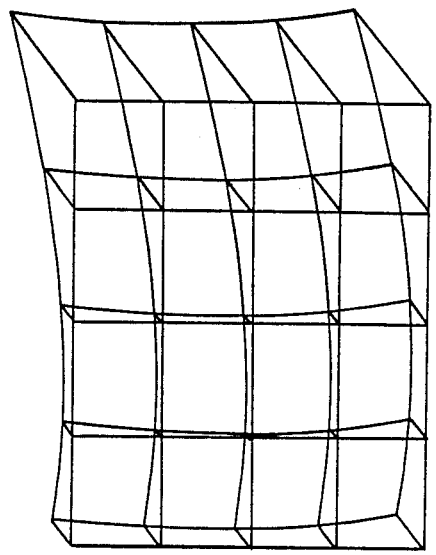
Figure 4:
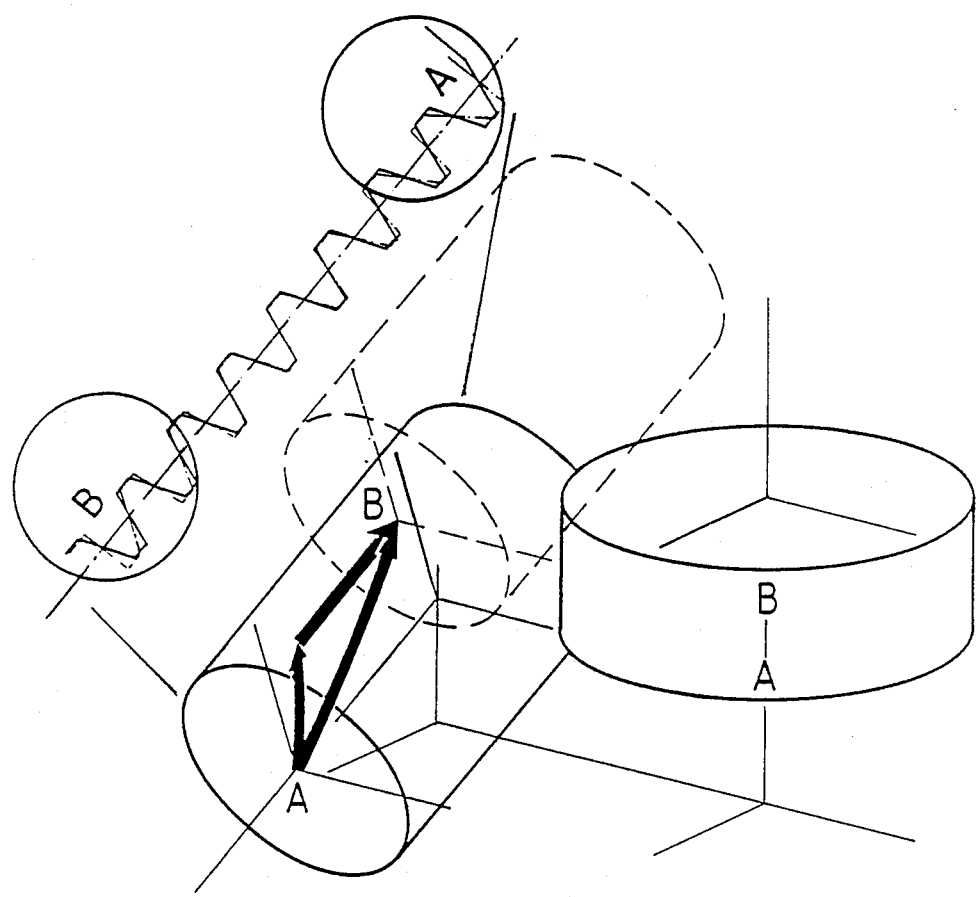
Figure 6A:
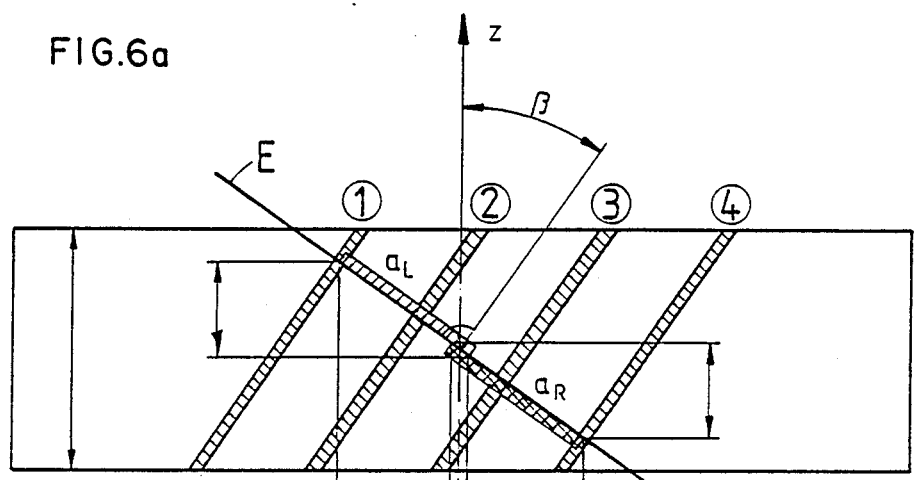
Figure 6B:
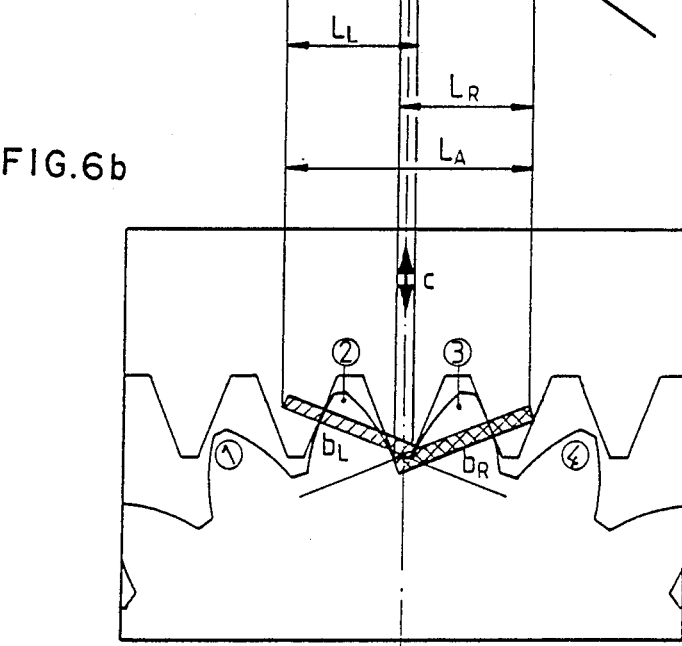

In the following, the invention shall be explained in more detail with reference to the enclosed drawing, in which FIG. 1 shows a perspective view of a tooth space with corrections indicated schematically, FIG. 2 shows a schematic view of a gear generating machine, FIGS. 3a to 3d show schematic views of the nominal and actual geometry of a tooth flank with prior art flank correction and with the inventive flank correction, FIG. 4 shows the relative position of the tool and work wheel during the generating process, FIGS. 5a to 5c show schematic views of the axially varying flank geometry of an inventive tool worm, FIGS. 6a, 6b show schematic views of the mesh relations between the tool and work wheel during machining of the tooth spaces of a helical gear.

Referring to FIG. 1, the possible flank corrections relate primarily to crowning, which may be convex or concave, show different amounts at the base, the middle or the tip of the tooth and extend straight or at an angle with respect to the center plane of the tooth space (conical form). For a smooth and supple mesh, the tooth flanks must not only have longitudinal crowning, corrections must also be made from the base to the tip. The tip is thus taken back slightly at the run-in and run-out areas of the tooth space in order to prevent edge interference. The relief must of course not be too great so as not to shorten the active profile excessively. The reference flank in the drawing is the theoretically exact involute profile. The figure shows the perspective top view of a tooth space; in the middle is the fillet or tooth bottom, the tooth flanks rise to the left and right toward the tip. As indicated by the drawing, the two flanks are corrected differently to do justice to the different deformation of the drive and coast flanks under load.

The inventive method can be applied, for example, in a machine for generation grinding involute gearings, as shown schematically in FIG. 2. On the machine bed is located the stationary work table on which the workpiece, for example a pretoothed gearwheel, is clamped with an appropriate clamping means having a vertical axis. For hob coupling with the tool worm, the workpiece may be rotated about its vertical axis. The motion is symbolized by the arrow referred to as 2.

The radially displaceable main column (the radial feed direction is symbolized by the arrow referred to as 3) bears a tangential slide for tangentially displacing the tool worm (this displacement direction is marked by the arrow referred to as 5). The tangential slide can also be moved axially (arrow 4) and swivelled about a horizontal axis (arrow 6).

The relative movement between the tool worm and the work wheel corresponds substantially to the pairing of a worm with a worm wheel, the worm representing the tool and the worm wheel the work wheel to be produced or fine machined. Material is removed with the aid of the rotary movements of the tool, on the one hand, and of the work wheel, on the other hand. Before cutting begins, feed is effected radially to the required plunge depth and machining is then performed axially by the conventional or climb method. In addition to the rotary motion of the worm the latter is displaced tangentially by a certain amount, so that the feed of the tool is composed of an axial and a tangential component. As a function of the axial feed component, there is also a radial feed of the tool, controlled via templates or by a program, to generate longitudinal crowning and a conical form.

FIG. 4 shows schematically the relative position of the tool and the workpiece. The position shown by unbroken lines corresponds to the beginning of machining, i.e. the machining of the run-in area of a tooth space. The workpiece rotates about a vertical axis while the tool is directed past the workpiece with an axial and a tangential component. The resulting motion is indicated in the vector diagram. The dash-lined position of the tool corresponds to the flank machining upon leaving the tooth space.

The mesh relations between the tool worm and the workpiece are shown in FIGS. 6a and 6b. The intersection curve projected onto an axial plane of the workpiece is shown as E in FIG. 6a. It marks the plane of action of all simultaneously formed points of the flank profile. As can be seen with reference to FIG. 6a, the right flanks of the tool and work wheel mesh only through the transverse path of contact $a_R$, and the left flanks through the transverse path of contact $a_L$. This results in length of action $L_L$ and $L_R$ between the tool and gearwheel for the left and right flanks. The overall length is defined as the profiling zone or length of the working area $L_A$. Referring to FIG. 6b, it is apparent that this length, on the axial plane of the tool, includes about three spirals. The parts of the tool length which are located before the working area or therebehind are available for a tangential tool displacement. $L_L$ and $b_R$ refer to the transverse paths of contact projected onto a transverse plane. The letter c indicates the correction motion for generating the crown or conical form.

FIG. 5a shows schematically an axial section through a plurality of spirals of a tool worm, whereby the area referred to as A on the right comes to engage the bottom area of a tooth space when traversing the tooth space from the bottom to the top, and the tooth referred to as B, or this worm spiral, comes to engage the top area of the tooth space. For example, the tooth or the worm spiral of the tool may be profiled at A in such a way as to remove more material in the root area of the right tooth flank than in the root area of the left tooth flank. The theoretically exact profile form of the tool in area A is indicated by unbroken lines in FIGS. 5a and 5b. The actual modified profile form is indicated by dot-dash lines. FIG. 5c schematically shows the result. The dotted curve shows the theoretically exact profile, while the unbroken curve shows the nominal correction.

In area B the tool is profiled so as to remove more material in the root area of the left flank than in the root area of the right flank. Again, the theoretically exact profile path of the tool is indicated by unbroken lines in FIGS. 5a and 5b, while the dot-dash line shows the corrected flank profile. FIG. 5c shows the result. The dotted line again refers to the theoretically exact profile, while the unbroken line shows the corrected flank.

As apparent from the opened axial section of the tool in FIG. 4, the tool is displaced from area A to area B when traversing the gearwheel width or height. In the bottom area of the tooth space there is therefore a different flank correction to that in the top area of the tooth space. The diagrammatic drawing shows that the middle of the tooth space is machined with a worm profile which hardly deviates from the theoretically exact form. Regarded across the width or height of the tooth space, a different axial area of the tool is associated with each tooth space area.

The effect of the inventive flank correction is shown schematically in FIGS. 3a to 3d. FIG. 3a shows the nominal geometry of a tooth flank, whereby the xy plane is the exact involute surface and which is the reference for corrections in the longitudinal direction of the flank and from the root to the tip. In the drawing the right edge is the root of the tooth, the left edge the tip, the upper edge the run-out area of the tooth space and the lower edge the run-in area of the tooth space. The flank corrections are within the range of about 5 to 20 micrometers. FIG. 3a shows quite clearly that the desired tip relief is to be considerably greater at the run-out area of the tooth space than at the run-in area; the longitudinal crowning is also asymmetrical.

FIG. 3b indicates the flank geometry which can be obtained by a normal tool, i.e. a grinding worm with constant flank geometry and a modified center distance across the tooth width. The crowning in the middle of the tooth height, i.e. the middle between the tip cylinder and the root cylinder, corresponds to the desired value, but the inclination of the plane of action leads to an undesirable distortion at the tip and root since the radial feed for generating the longitudinal crowning is only correct for the middle of the tooth. A comparison of the nominal geometry with the geometry that can be obtained by the prior art is shown in FIG. 3c. The deviation from the nominal geometry is particularly great at the run-out area of the tooth space, i.e. on the right at the top of the drawing. For a right flank there are distortions with similar values but with partly opposed distribution.

Finally, FIG. 3d shows a comparison of the nominal geometry and the generated geometry using the inventive method. Comparison of FIGS. 3c and 3d clearly indicates that using the inventive method one can obtain a virtually perfect correspondence of the actual geometry to the nominal geometry.

I claim:

1. A method for grinding a helical gearwheel by continuous diagonal hobbing along a working area having a length defined by a contact length between the gearwheel and a grinding tool, comprising the steps of:

rotating the gearwheel about its center axis;

turning the grinding tool about its center axis, the tool comprising a substantially involuted worm having a length which is greater than the length of the working area and having right and left flanks with a pressure angle;

grinding the gearwheel with the involuted worm tool; and during the grinding step, moving the tool such that the distance between the center axis of the tool and the center axis of the gearwheel is changed and also moving the tool both axially and tangentially relative to the gearwheel to produce a diagonal motion to generate lateral crowning;

wherein the pressure angle of the right flanks decreases continuously from a first end of the tool toward a second end of the tool and the pressure angle of the left flanks increases continuously from the first end to the second end of the tool, whereby the maximum pressure angle of the right flanks coincides with the minimum pressure angle of the left flanks at the first end of the tool and the minimum pressure angle of the right flanks coincides with the maximum pressure angle of the left flanks at the second end of the tool.

* * * * *